United States Patent
Lopez et al.

(10) Patent No.: US 10,920,934 B2
(45) Date of Patent: Feb. 16, 2021

(54) MOBILE HYDROGEN DISPENSER FOR FUEL CELL VEHICLES

(71) Applicant: Air Liquide Advanced Technologies U.S. LLC, Houston, TX (US)

(72) Inventors: Jorge E. Lopez, Houston, TX (US); Aaron Harris, San Mateo, CA (US); Chad Nickell, Houston, TX (US); Gerhard M. Schmidt, Vancouver (CA); Owen C. Owens, Vancouver (CA); Per Olsson, Atlanta, GA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 67 days.

(21) Appl. No.: 16/290,000

(22) Filed: Mar. 1, 2019

(65) Prior Publication Data

US 2019/0271439 A1    Sep. 5, 2019

Related U.S. Application Data

(60) Provisional application No. 62/637,830, filed on Mar. 2, 2018.

(51) Int. Cl.
*F17C 5/06* (2006.01)
*F17C 13/02* (2006.01)
(Continued)

(52) U.S. Cl.
CPC ............. *F17C 5/06* (2013.01); *F17C 5/007* (2013.01); *F17C 13/00* (2013.01); *F17C 13/025* (2013.01);
(Continued)

(58) Field of Classification Search
CPC .. F17C 5/06; F17C 13/00; F17C 5/007; F17C 13/025; F17C 2265/065; F17C 2205/035;
(Continued)

(56) References Cited

U.S. PATENT DOCUMENTS

| | | | | |
|---|---|---|---|---|
| 3,507,302 A | * | 4/1970 | Scott | G05D 7/0193 137/613 |
| 4,275,752 A | * | 6/1981 | Collier | G05D 7/0106 137/10 |

(Continued)

FOREIGN PATENT DOCUMENTS

WO    WO 96/01391    1/1996

OTHER PUBLICATIONS

International Search Report and Written Opinion for PCT/US2019/020271, dated Jun. 26, 2019.
(Continued)

*Primary Examiner* — Timothy P. Kelly
*Assistant Examiner* — Stephanie A Shrieves
(74) *Attorney, Agent, or Firm* — Christopher J. Cronin (57) ABSTRACT

A mobile dispenser may be used to at least partially fill hydrogen tanks of fuel cell-powered vehicles. The dispenser uses a purely mechanical control of the fill using an orifice plate across which a pressure differential is maintained through use of a backpressure regulator whose reference pressure is controlled by a differential pressure regulator. Because it does need or use electrical power, it may be used in situations where no electrical power is available or convenient.

5 Claims, 4 Drawing Sheets

(51) Int. Cl.
*G05D 7/03* (2006.01)
*G05D 16/00* (2006.01)
*F17C 13/00* (2006.01)
*G05D 16/16* (2006.01)
*F17C 5/00* (2006.01)
*F16H 1/28* (2006.01)

(52) U.S. Cl.
CPC .............. *G05D 7/03* (2013.01); *G05D 16/024* (2019.01); *G05D 16/028* (2019.01); *G05D 16/16* (2013.01); *F16H 1/2818* (2013.01); *F17C 2205/035* (2013.01); *F17C 2205/0338* (2013.01); *F17C 2221/012* (2013.01); *F17C 2223/013* (2013.01); *F17C 2223/0123* (2013.01); *F17C 2223/036* (2013.01); *F17C 2225/0123* (2013.01); *F17C 2225/036* (2013.01); *F17C 2250/0626* (2013.01); *F17C 2265/065* (2013.01); *F17C 2270/0139* (2013.01)

(58) Field of Classification Search
CPC .......... F17C 2223/036; F17C 2221/012; F17C 2225/036; F17C 2225/0123; F17C 2250/0626; F17C 2270/0139; F17C 2205/0338; F17C 2223/0123; F17C 2223/013; F17C 13/02; F17C 13/084; G05D 7/03; G05D 16/024; G05D 16/16; G05D 16/028; Y02E 60/321; F16H 1/2818
USPC ........................................................ 141/231
See application file for complete search history.

(56) References Cited

U.S. PATENT DOCUMENTS

| | | | | |
|---|---|---|---|---|
| 5,687,776 | A | * | 11/1997 | Forgash .................. F17C 5/007 141/11 |
| 5,771,946 | A | * | 6/1998 | Kooy ........................ F17C 6/00 141/11 |
| 6,786,245 | B1 | * | 9/2004 | Eichelberger ............ B60S 5/02 141/18 |
| 6,786,254 | B1 | | 9/2004 | Eichelberer et al. |
| 7,921,883 | B2 | | 4/2011 | Cohen et al. |
| 9,146,007 | B2 | * | 9/2015 | Schwaiger ................ F17D 1/00 |
| 2006/0180240 | A1 | * | 8/2006 | Niedzwiechi ............. B60P 3/14 141/231 |
| 2006/0260949 | A1 | | 11/2006 | Mitlitsky et al. |
| 2007/0079892 | A1 | * | 4/2007 | Cohen .................. G05D 16/204 141/105 |
| 2008/0185068 | A1 | * | 8/2008 | Cohen ....................... F17C 5/06 141/94 |
| 2015/0075488 | A1 | * | 3/2015 | Touchette ........... F02D 19/0678 123/299 |
| 2017/0102110 | A1 | | 4/2017 | Lomax et al. |
| 2017/0147009 | A1 | * | 5/2017 | Jones .................. G05B 19/4184 |

OTHER PUBLICATIONS

SAE standard J2601 of the Society of Automotive Engineers; Surface Vehicle Technical Information Report, TIR J2601 revise proposed draft, Mar. 2010, pp. 1-36, V23.

\* cited by examiner

MOBILE HYDROGEN DISPENSER FOR FUEL CELL VEHICLES

CROSS-REFERENCE TO RELATED APPLICATIONS

This application claims the benefit of U.S. Provisional Application No. 62/637,830, filed Mar. 2, 2018.

BACKGROUND

Field of the Invention

The present invention relates to the filling of vehicle hydrogen tanks using a mobile gas dispenser.

Related Art

In an effort to boost utilization of sustainable fuels, such as hydrogen gas for use in fuel cell vehicles, several technologies have been proposed or implemented for achieving fills of the hydrogen tanks aboard such vehicles. One typical method includes a permanent filling station including relatively large storage tanks, one or more compressors, one or more buffer tanks, heat exchangers for cooling the compressed hydrogen, and instrumentation and valves for performing the filling of the vehicle tank in a controlled manner.

While these permanent filling stations perform quite satisfactorily, it is recognized that station upsets may occur from time to time resulting a disruption of the availability of hydrogen for filling the vehicle tanks. This may result in a customer arriving at the station only to find a technician at the site diagnosing or fixing the issue preventing operation of the station. If the customer is unable or not willing to wait until station operation is resumed, the customer may simply drive to the nearest operative filling station. This is a problem if the vehicle tank does not contain enough hydrogen for the vehicle to reach the nearest station. A related problem occurs when a driver neglects to drive to a filling station before the vehicle tanks is emptied of hydrogen.

For areas in which the infrastructure for refilling vehicle tanks with hydrogen is not as well developed, drivers may have a need for refilling their tank at a location that is not served by a filling station. This problem is sometimes referred to as "range anxiety" and may inhibit further commercialization of hydrogen-fueled fuel cell vehicles. For areas that are served by filling stations, it may be inconvenient to veer off a particular route in between two destinations for the purpose of refilling the vehicle tank.

To remedy these problems, some have proposed the use of mobile refuelers that may be driven to the inoperative station and used to partially fill the vehicle tank with an amount of hydrogen allowing it to be driven to the nearest station. For example, U.S. Pat. No. 6,786,245 discloses a mobile refueler that may be used for driving to a stranded hydrogen-powered vehicle and filling the vehicle's tank with an amount of hydrogen sufficient to allow it to drive to the nearest operative station. The fill is achieved using a cascade filling system employing numerous actuating valves, pressure and temperature sensors, solenoid valves, a programmable logic controller (PLC) programmed with an algorithm designed to achieve the fill in an abbreviated time.

While the mobile refueler disclosed by U.S. Pat. No. 6,786,245 is touted as achieving the cascade fill without using mechanical compression, external power, or other external utilities, this mobile refueler still requires a power source for powering the controller. This requires the mobile refueler to carry a mobile power source, such as a photovoltaic cell array and associated battery or a hydrogen-powered fuel cell, so that the PLC-controlled cascade fill may still be performed. This adds greater expense, weight and complexity, requires a larger footprint, increases maintenance frequency and expense, and in the case of a photovoltaic cell array and associated battery, is subject to losing voltage sufficient to power the PLC during cloudy weather.

Because the mobile refueler disclosed by U.S. Pat. No. 6,786,245 utilizes a cascade filling system, it requires the presence of at least two high pressure hydrogen cylinders which a relatively heavy and must be provided with a heavy duty frame to guard against damage to those cylinders. As a result, the mobile refueler is heavy enough to require that it either be towed by a commercial vehicle (such as a ¾ ton pick-up truck) or be borne by rail, ship, or other truck mounted systems. Such a towed or transportation vehicle-borne mobile fueler is relatively expensive to manufacture and operate and may be difficult to maneuver into small spaces adjacent the vehicle to be filled.

Because the mobile refueler disclosed by U.S. Pat. No. 6,786,245 relies upon a PLC-controlled cascade fill, it is relatively more prone to equipment failure due to the presence of numerous valves, sensors, controllers, and associated instrumentation. Such a mobile fueler is expensive to manufacture, is subject to a relatively greater frequency of maintenance, and may experience relatively more equipment failures in comparison to less complex, mechanically robust systems.

Because the mobile refueler disclosed by U.S. Pat. No. 6,786,245 relies upon high pressure hydrogen cylinders integrated into the refueler, once the cylinders are emptied, it must be driven to a centralized refilling depot where it may be topped up. Such a mobile refueler is thus more apt to be unavailable to stranded customers due to the need for refilling.

SUMMARY

There is disclosed a mobile hydrogen dispenser for at least partially filling a hydrogen tank of a fuel cell-powered vehicle. The dispenser comprises: a first supply line having upstream and downstream ends; a first orifice plate disposed in the first supply line; a backpressure regulator disposed at the downstream end of the first supply line; a delivery line having upstream and downstream ends; a nozzle fluidly communicating with the downstream end of the delivery line that is adapted and configured to engage with an opening of a fuel tank of a fuel cell vehicle; a reference pressure line having an upstream end and a downstream end; a differential pressure regulator having an inlet and an outlet; and a first pilot line. The upstream end of the first supply line is adapted and configured to receive a flow of hydrogen from a hydrogen source. The backpressure regulator is a dome-loaded or spring-and-dome loaded backpressure regulator that is adapted and configured to maintain a pressure of gas in said first supply line between said orifice plate and said backpressure regulator at or below a variable set point pressure of the backpressure regulator. The variable set point pressure is set by a pressure in a dome of the backpressure regulator. The upstream end is adapted and configured to receive a flow of hydrogen from the backpressure regulator. The downstream end of the delivery line is adapted and configured to direct the received flow of hydrogen to a hydrogen tank of a fuel cell-powered vehicle. The differential pressure regulator is in downstream flow communication with the downstream end of the reference pressure line. The first pilot line is in flow communication between the differential pressure regulator and a dome of the back pressure regulator. The differential pressure regulator is adapted and configured to maintain a constant pressure differential ΔP between a pressure of hydrogen in the reference pressure line and a pressure of hydrogen in the first pilot line.

There is also disclosed a method of at least partially filling the hydrogen tank of a fuel cell-powered vehicle. The method includes the following steps. The above-disclosed mobile dispenser is provided. The upstream end of the first supply line is placed in downstream fluid communication with a source of gaseous hydrogen. The downstream end of the delivery line is placed in upstream fluid communication with the vehicle tank. A flow of hydrogen is allowed from the source, through the mobile dispenser, and into the vehicle tank. The allowed flow is discontinued. The upstream end of the supply line is removed from fluid communication with the source. The downstream end of the delivery line is removed from fluid communication with the vehicle tank.

By "fluid communication", such as in the phrase "a nozzle fluidly communicating with the downstream end", we do not mean that that the nozzle and the downstream end of the delivery line are in electronic signal communication with one another as is discussed in SAE (Society of Automotive Engineers) Standard J2601.

By "upstream end" or "downstream end", we mean the end that is upstream (or downstream) in the context of the direction of the flow of hydrogen from the hydrogen source to the fuel tank.

The above-disclosed mobile dispenser may include one or more of the following aspects:
the mobile dispenser further comprises: a second supply line having an upstream end and a downstream end; a second orifice plate disposed in the second supply line between the upstream and downstream ends thereof, the upstream end of the second supply line being adapted and configured to receive the associated flow of hydrogen from the source at either a same pressure as that of the first supply line or at a pressure such that there is a constant difference in pressure between those of the first and second supply lines, the downstream end of the second supply line being in flow communication with the first supply line in between the first orifice plate and the backpressure regulator; and a pressure control valve disposed in the second supply line that is adapted and configured to allow a flow of hydrogen through the second supply line when a pressure in the delivery line is below a first predetermined set point pressure and to prevent a flow of hydrogen through the second supply line when a pressure in the delivery line is at or above the first predetermined set point pressure.
the reference pressure line being adapted and configured to receive the associated flow of hydrogen from the source at either a same pressure as that of the first supply line or at a pressure such that there is a constant difference in pressure between those of the first supply and reference pressure lines.
the reference pressure line is further adapted and configured to receive the associated flow of hydrogen from the source at either a same pressure as that of the second supply line or at a pressure such that there is a constant difference in pressure between those of the second supply and reference pressure lines.
the mobile dispenser further comprises: a third supply line having an upstream end and a downstream end; a third orifice plate disposed in the third supply line between the upstream and downstream ends thereof, the upstream end of the third supply line being adapted and configured to receive the associated flow of hydrogen from the source at either a same pressure as that of the first supply line or at a pressure such that there is a constant difference in pressure between those of the first and third supply lines, the downstream end of the third supply line being in flow communication with the first supply line in between the first orifice plate and the backpressure regulator; and a pressure control valve disposed in the third supply line that is adapted and configured to allow a flow of hydrogen through the third supply line when a pressure in the delivery line is below a second fixed set point pressure and to prevent a flow of hydrogen through the third supply line when a pressure in the delivery line is at or above the second fixed set point pressure.
the reference pressure line is further adapted and configured to receive the associated flow of hydrogen from the source at either a same pressure as that of the second supply line or at a pressure such that there is a constant difference in pressure between those of the second supply and reference pressure lines.
the mobile dispenser is adapted and configured to provide a constant mass flow rate of hydrogen from the downstream end of the delivery line.
said discontinuation of said flow automatically occurs upon reaching pressure balance between the source and the vehicle tank.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION

When operation of a hydrogen filling station for filling hydrogen tanks of fuel cell vehicles must be stopped due to equipment failure, the primary maintenance goal is to return the station to full operation. In fulfillment of this goal, some repairs may require several hours to complete, and in rare cases, additional time may be required for a proper diagnosis of the problem. In the meantime, vehicle operators requesting a fill at the station may be stranded because the vehicle tank may not contain an amount of hydrogen that sufficient to drive the vehicle to a different, and operable, filling station. The mobile hydrogen dispenser of the present invention may be used to at least partially fill the tanks of these stranded vehicle operators so that they have at least enough hydrogen to drive to a nearby station for a more complete fill. The mobile hydrogen dispenser of the present invention may also be used to at least partially fill the tanks of fuel cell vehicles at hydrogen filling stations that have lost power to the compressor(s) or whose compressor(s) or other equipment is malfunctioning.

The filling of the hydrogen tank (of the fuel cell vehicle) results from the pressure differential between the relatively higher pressure hydrogen source and the relatively lower pressure hydrogen tank. In order to safely fill the tank, in one embodiment the mobile dispenser dispenses hydrogen with a controlled, constant mass flow rate. In another embodiment and also in order to safely fill the tank at ambient temperatures, the tank is filled with a controlled, relatively constant pressure ramp rate that is dictated by the ambient temperature. To provide the foregoing types of controls, the mobile dispenser uses a purely mechanical solution involving pressure regulators and orifice(s). Additionally, the mobile dispenser does not require a user for controlling flow.

The hydrogen tank of the fuel cell vehicle is filled with hydrogen from a hydrogen source through pressure equalization. By pressure equalization, we mean that hydrogen flows from the relatively higher pressure hydrogen source to the relatively lower pressure vehicle tank until the pressure in the tank equals that of the source. Thus, the pressure of the hydrogen source must be higher than that of the hydrogen tank or pressure-equalization based fill cannot proceed. With this in mind, if the pressure of the hydrogen source is below the nominally maximum pressure of the hydrogen tank that would be realized if the tank was at full capacity, only a partial-fill of the tank will be realized. In contrast to some conventional hydrogen tank filling techniques in which the pressure of the hydrogen source is lower than the final hydrogen tank pressure at full capacity, the system does not include a compressor allowing the pressure of the hydrogen source to be boosted to the relatively high pressures that may be necessary for achieving a full fill of the hydrogen tank.

The type of hydrogen source is not limited and includes gaseous hydrogen vessels such as cylinders, tube trailers, and onsite storage tanks. Alternatively, the hydrogen source may be an onsite storage tank containing liquid hydrogen connected to a vaporizer for providing a flow of gaseous hydrogen to the dispenser. The hydrogen of the source typically meets the specifications for fuel cell vehicles and may be compliant with the quality specifications described in SAE J2719 of the Society of Automotive Engineers ("Hydrogen Quality Standards for Fuel Cell Vehicles"). In order to allow the hydrogen tank of the fuel cell-powered vehicle to be filled with hydrogen from the source by pressure equalization, the hydrogen source has a pressure above that of the vehicle tank. While it of course can be higher or lower, typically, the pressure of the hydrogen source will range from 165-700 bar.

Similarly, the type of fuel cell vehicle is not limited and includes forklifts, cars, and trucks. Such vehicles may be compliant with the specifications described in SAE J2579 of the Society of Automotive Engineers ("Standard for Fuel Systems in Fuel Cell and Other Hydrogen Fueled Vehicles").

Figure 1:
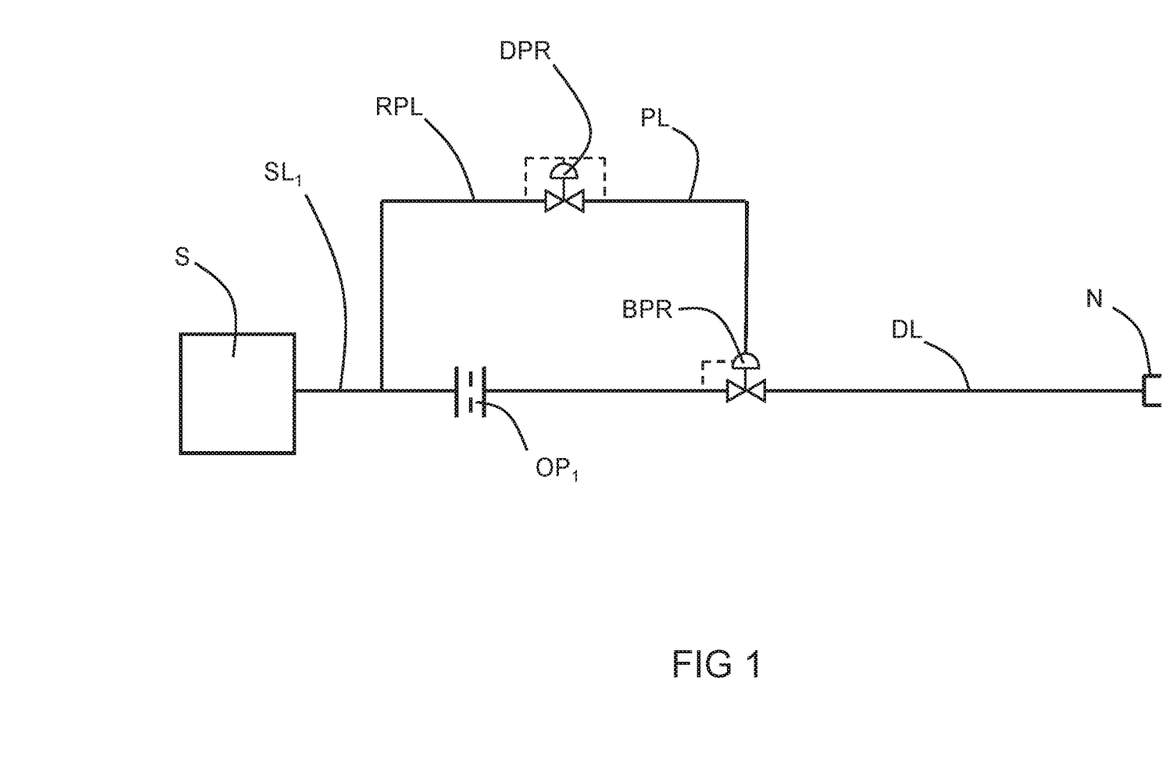
FIG. 1 is a schematic of the system of the invention.

As best shown in FIG. 1, the dispenser includes a first supply line $SL_1$. The upstream end of the first supply line $SL_1$ is adapted and configured to be fluidly connected with a hydrogen source S. While any conventional industrial gas equipment may be used in connecting the hydrogen source S with the upstream end of the first supply line $SL_1$, typically, such connection is compliant with the specifications described in ANSI/CSA HGV 4.10-2012 of the American National Standards Institute ("Standards for Fittings for Compressed Hydrogen Gas and Hydrogen Rich Gas Mixtures"). Other line, valve, regulator, and nozzle connections may also be compliant with ANSI/CSA HGV 4.10-2012.

A first orifice plate $OP_1$ is disposed in the first supply line $SL_1$. An orifice plate, also known as a restriction plate, is a well-known device that is installed in gas lines for restricting the flow of the gas through the line. As will be described later, a constant pressure difference in the first supply line $SL_1$ between the upstream and downstream sides of the orifice plate $OP_1$ is maintained (as well as between the upstream side of the orifice plate $OP_1$ and the vehicle tank). Because this pressure difference is fixed, any decrease in the pressure of the hydrogen source S will not change the mass flow rate through the orifice plate $OP_1$. Thus, a constant mass flow rate is achieved. By constant mass flow rate, we mean that the mass flow rate does not vary more than 50% over the course of the fill, or more typically, not more than 25% over the course of the fill.

The first supply line $SL_1$ terminates at an inlet of a backpressure regulator BPR. A backpressure regulator is a well-known type of valve that is placed in a gas line for maintaining a pressure in the line upstream of the backpressure regulator at a set point pressure. While the pressure in such a line upstream of a backpressure regulator may, for reasons unrelated to the backpressure regulator, decrease below the set point, the backpressure regulator is designed to prevent the pressure in such a line from going over the set point. Backpressure regulators may be contrasted with pressure regulators which are valves placed in a gas line for supplying gas at a constant pressure downstream of the pressure regulator. The backpressure regulator $SL_1$ used in the dispenser is a dome-loaded or spring and dome-loaded type backpressure regulator. In dome-loaded or spring and dome-loaded backpressure regulators, a reference pressure supplied to the dome of the backpressure regulator may be used to vary its set point, and hence, vary the pressure maintained in the line upstream of the backpressure regulator. For example, if the reference pressure supplied to the dome is lowered by 10 bar, the set point pressure is similarly lowered by 10 bar As will be described below, the reference pressure is supplied to the dome of the backpressure regulator $SL_1$ with a reference pressure line RPL, differential pressure regulator DPR, and pilot line PL. The pressure of the flow of hydrogen from the hydrogen source S that is received into the reference pressure line RPL is typically the same as the pressure of the flow of hydrogen from the hydrogen source S that is received into the first supply line $SL_1$. The pressure of the flow of hydrogen received into the reference pressure line RPL from the source S is the same as that of the flow of hydrogen received into the first supply line $SL_1$ if both lines RPL, $SL_1$ receive hydrogen directly from the source S without any flow restriction devices in either line RPL, $SL_1$ or if both lines RPL, $SL_1$ receive directly from the source S with the same type of flow restriction device in each line. One simple way of achieving this is by tapping the upstream end of the reference pressure line RPL in the first supply line $SL_1$ as shown in FIG. 1. Alternatively, hydrogen may be supplied in parallel from the source to each of the reference pressure and first supply lines RPL, $SL_1$.

Disposed at the downstream end of the reference pressure line RPL is a differential pressure regulator DPR having an inlet and an outlet. The pilot line PL extends from the differential pressure regulator DPL outlet to the dome of the backpressure regulator BPR. In this manner, the set point pressure of the backpressure regulator BPR is set/varied by the pressure of the hydrogen in the pilot line PL. A differential pressure regulator is a well-known device that is placed in a gas line to lower a pressure of the gas by a constant amount. In other words, there is a constant pressure differential between the gas in the line upstream of the differential pressure regulator and the gas in the line downstream of the differential pressure regulator. The differential pressure regulator DPR of the mobile dispenser is preset to achieve a predetermined pressure differential between the hydrogen in the reference pressure line RPL and the hydrogen in the pilot line PL. While the pressure differential need not be set to any particular value, typically it ranges from 5-30 bar.

The set point pressure of the backpressure regulator BPR is set/varied by the pressure in the pilot line PL. Thus, when the pressure of the hydrogen received into the reference pressure and first supply lines RPL, $SL_1$ is at a pressure P1 and the differential pressure regulator DPR supplies hydrogen to the pilot line PL at a pressure P2, the pressure in the first supply line $SL_1$ in between the orifice plate $OP_1$ and the backpressure regulator BPR is also maintained at pressure P2. Since the difference in pressure between the hydrogen in the reference pressure line RPL and the pilot line PL is maintained at a constant value by the differential pressure regulator DPR, the difference in pressure between the hydrogen in the first supply line $SL_1$ upstream of the orifice plate $OP_1$ and the hydrogen in the first supply line $SL_1$ downstream of the orifice plate $OP_1$ is accordingly also constant.

This constant pressure differential is significant because, for a flow of gas across an orifice plate under non-choked flow conditions, the mass flow rate is constant if the pressure differential across the orifice plate is constant. Indeed, a specific mass flow rate across the orifice plate (under non-choked flow conditions) can be set by controlling the differential pressure across it. This is because if the upstream pressure P1 and downstream pressure P2 are known and constant, the fixed mass flow rate can be calculated according to Bernoulli's equation using remaining constants established by research:

$$q_m = \frac{C_d}{\sqrt{1-\beta^4}} \varepsilon \frac{\pi}{4} d^2 \sqrt{2\rho_1 \Delta p}$$

where:
$C_d$=dimensionless coefficient of discharge
$\beta$=dimensionless diameter ratio of orifice diameter d to pipe diameter D
$\varepsilon$=dimensionless expansibility factor
d=internal orifice diameter
$\rho_1$=fluid density in plane of upstream tapping (kg/m³)
$\Delta p$=differential pressure measured across the orifice (Pa)

Thus, the mass flow rate of hydrogen across the orifice plate in the mobile dispenser is constant, despite the fact that the pressure of the hydrogen in the source may decrease over time and the pressure of the hydrogen in the vehicle tank may increase during the course of the fill.

Since the purpose of the mobile dispenser is to use it with any source of hydrogen storage (i.e. storage tanks) and not necessarily from a hydrogen source whose pressure is maintained by a compressor, the pressure of a hydrogen source (whose pressure is not maintained constant with a compressor) decrease over the course of the fill.

The constant mass flow rate achieved by the mobile dispenser is significant because, despite the absence of electronically controlled valves in the inventive dispenser, it can still provide a reasonable amount of certainty that too-high flow rates of hydrogen will not be passed to the vehicle tank and cause unsafe levels of overheating and/or over-pressurization. As a result, the inventive dispenser may be operated with a reasonable degree of safety despite the fact that it does not include electronically controlled valves commanded by a controller receiving data from pressure sensors and/or flow meters.

The mobile dispenser is further advantageous over the use of two standard pressure reducing regulators. If a standard pressure reducing regulator (a first regulator) was instead used to set P1 and a separate regulator (a second regulator) used to set P2, once the source pressure got below the first regulator's set point, the fill would stop. It would also not allow the P1 pressure to change with the decrease in storage pressure because it is fixed. To get the most gas out of the source, this P1 regulator would need to be set very low and by doing this, would not be able to fill the vehicle tank to a satisfactory capacity if it was close to the initial source pressure (since it would have been set very low). Because the mobile dispenser of the invention instead uses a differential pressure regulator for provision of a reference pressure to the back pressure regulator, it avoids the foregoing problem that would be expected from the use of two standard pressure reducing regulators without a differential pressure regulator and back pressure regulator.

Hydrogen from the outlet of the backpressure regulator BPR is received by an upstream end of a delivery line DL. The downstream end of the delivery line terminates in a nozzle N that is adapted and configured to engage with an opening of a hydrogen tank of a fuel cell vehicle.

The embodiment of FIG. 1 is advantageous because it allows the mobile dispenser to be operated in a purely mechanical manner.

In contrast, conventional permanent hydrogen filling stations use a pressure control valve to constantly control the pressure ramp rate that is experienced by the hydrogen tank. In other words, such stations seek to maintain the change in pressure (of the vehicle tank) over time as a constant, a constant referred to the as the average pressure ramp rate or APRR. Such a pressure control valve is controlled by a PLC and basically acts as a variable orifice by decreasing the cross-section of the flow path through the pressure control valve as the pressure in the vehicle tank increases. If the PLC-calculated pressure ramp rate exceeds (or decreases below) the APRR expected at a given moment in time, the PLC commands that pressure control valve to decrease (or increase) the cross-section of the flow path through the pressure control valve in order to more closely follow the APRR.

Another technique used by conventional controlled-gas flow systems includes the use of a standard pressure control valve with no PLC control (that is purely mechanical, such as with a spring). If such a pressure control valve was used without a differential pressure regulator and backpressure regulator, such a pressure control valve could only be set to a specific set point and could not be varied unless an operator changed the set point.

In contrast, the use of an orifice plate $OP_1$, differential pressure regulator DPR and backpressure regulator BPR of the mobile dispenser avoids the need for a PLC, the need for powering a PLC, and the need for operator control. This is because the flow of hydrogen is controlled in a purely mechanical way by the orifice plate $OP_1$, the differential pressure regulator DPR, and backpressure regulator BPR so as to keep a constant differential pressure across the orifice plate $OP_1$.

As an additional mechanism for limiting overheating and over-pressurization of hydrogen tanks of fuel cell vehicles, some have proposed performing the fill during which the pressure ramp rate is controlled to a predetermined average pressure ramp rate (APRR), such as the SAE standard J2601 of the Society of Automotive Engineers. The APRR is the average increase in pressure per unit time over the fill. One particular version of J2601 dated March, 2010 calls for using an APRR determined to be safe for filling at ambient temperature conditions (i.e., the hydrogen from the source is not temperature-controlled). Under that standard, the pressure ramp rate during the fill is controlled so as to achieve an APRR that is called for by a look-up table that specifies the APRR based upon the ambient temperature ranging from −30° C. to 40° C. It should be noted that portions of the fill in which flow of hydrogen to the vehicle tank is discontinued (such as pauses during checks for leaks, etc.), are not included in the time component for calculation of APRR. The J2601 standard and related techniques seek to maintain an actual pressure ramp rate either within a percent deviation above/blow the intended APRR or within a fixed pressure range above and below the intended APRR. Conventional systems and methods typically achieve this control of the pressure ramp rate using a variable pressure control valve, one or more pressure sensors, and an electrically powered controller.

While the embodiment of FIG. 1 quite satisfactorily delivers hydrogen to the hydrogen tank at a constant mass flow rate, theoretically some of the pressure rise in the vehicle tank per unit time may be above and beyond what would be expected given such a constant mass flow rate due to the increase in the compressibility factor of hydrogen as pressure increases. In the event that this change in compressibility factor renders maintenance of the pressure ramp rate within a range above/below an intended APRR more difficult, the embodiments of FIG. 2 or FIG. 3 may be used to address this theoretical issue by using additional supply lines and orifice plates and pressure control valves to control flow through the supply lines.

Figure 2:
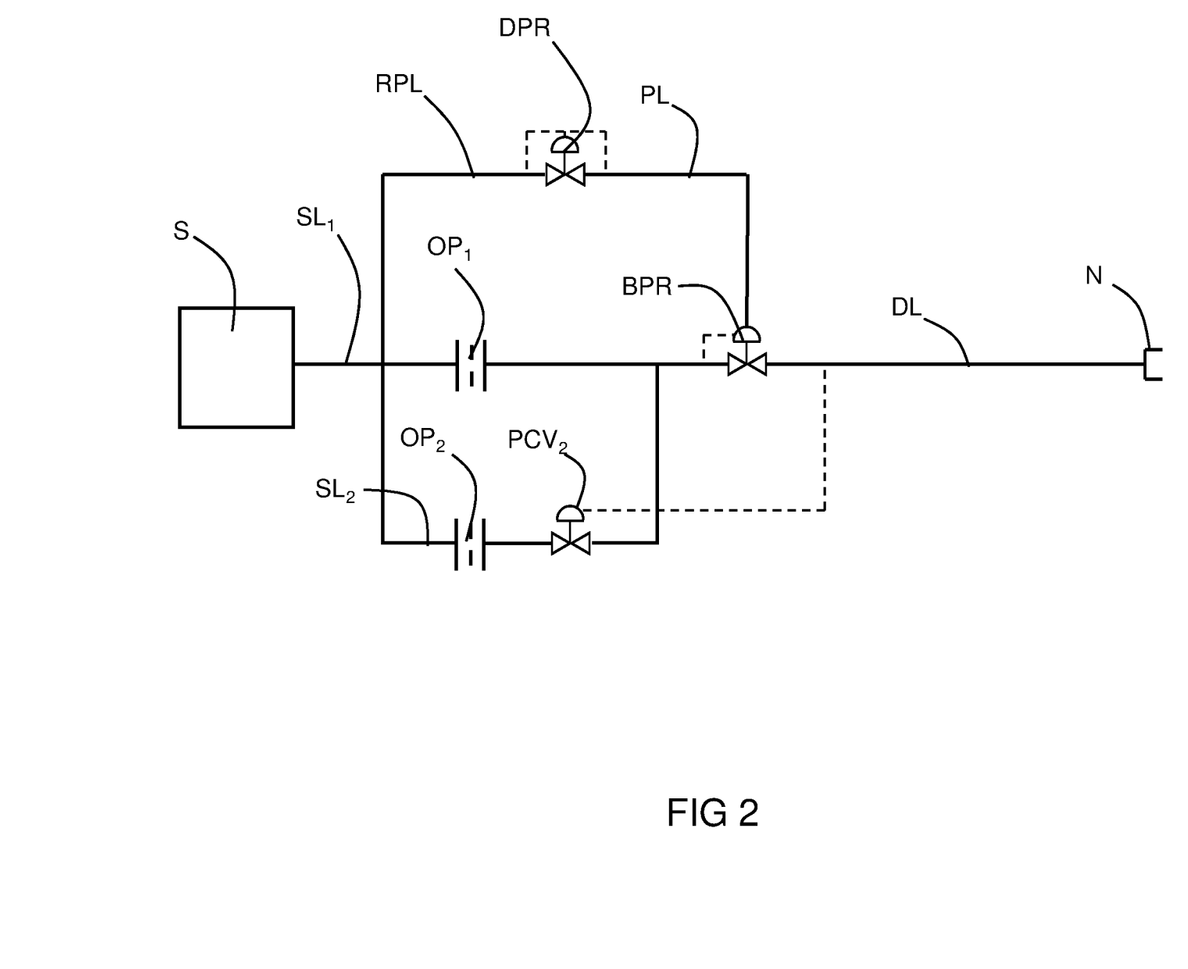
FIG. 2 is a schematic of a variation of the system of FIG. 1 that includes a second supply line.

As best illustrated in FIG. 2, the dispenser includes each of the features of the dispenser of FIG. 1 and also includes a second supply line $SL_2$ having an upstream end. The pressure of the flow of hydrogen received into the second supply line $SL_2$ from the source S is typically the same as the pressure of the flow of hydrogen received into the reference pressure line RPL from the source S. The pressure of the flow of hydrogen received into the reference pressure line RPL from the source S is the same as that of the flow of hydrogen received into the second supply line $SL_2$ if both lines RPL, $SL_2$ receive hydrogen directly from the source S without any flow restriction devices in either line or if both lines RPL, $SL_2$ receive directly from the source with the same type of flow restriction device in each line. One simple way of achieving this is by tapping the upstream end of the second supply line $SL_2$ in the first supply line as shown in FIG. 2. Alternatively, hydrogen may be supplied in parallel from the source S to each of the reference pressure RPL and second supply lines $SL_2$.

A second orifice plate $OP_2$ is disposed in the second supply line $SL_2$ between the upstream and downstream ends. The dimensions and variables associated with the first and second orifice plates $OP_1$, $OP_2$ and the first and second supply lines $SL_1$, $SL_2$ are selected so that a same constant mass flow rate through each of the first and second supply lines $SL_1$, $SL_2$, is achieved.

A pressure control valve $PCV_2$ is disposed in the second supply line $SL_2$ between the second orifice plate $OP_2$ and the downstream end of the second supply line $SL_2$. This pressure control valve $PCV_2$ is adapted and configured to allow a flow of hydrogen through the second supply line $SL_2$ when a pressure in the delivery line DL is below a first predetermined set point pressure and to prevent a flow of hydrogen through the second supply line $SL_2$ when a pressure in the delivery line DL is at or above the first predetermined set point pressure. Thus, this pressure control valve $PCV_2$ is not a variable pressure valve in that it is either entirely open or entirely closed.

Figure 3:
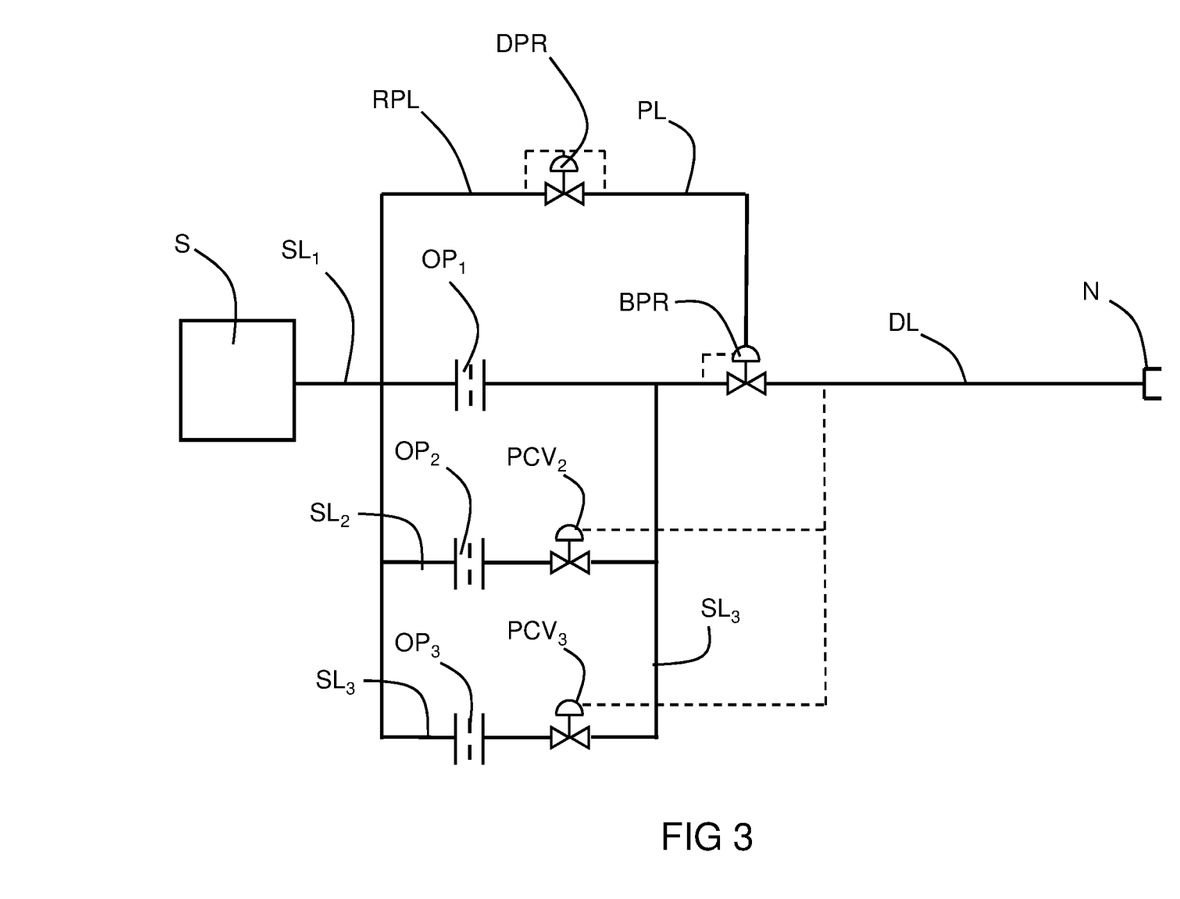
FIG. 3 is a schematic of a variation of the system of FIG. 1 that includes second and third supply lines.

As best shown in FIG. 3, the dispenser includes each of the features of the dispenser of FIG. 2 and also includes a third supply line $SL_3$ having an upstream end. The pressure of the flow of hydrogen received into the third supply line $SL_3$ from the hydrogen source S is typically at a same as the pressure of the flow of the hydrogen received into the reference pressure line RPL from the source S. The pressure of the flow of hydrogen received into the reference pressure line RPL from the source S is the same as that of the flow of hydrogen received into the third supply line $SL_3$ if both lines $SL_3$, RPL receive hydrogen directly from the source S without any flow restriction devices in either line or if both lines $SL_3$, RPL receive directly from the source S with the same type of flow restriction device in each line $SL_3$, RPL. One simple way of achieving this is by tapping the upstream end of the third supply line $SL_3$ in the first supply line $SL_1$ as shown in FIG. 3. Alternatively, hydrogen may be supplied in parallel from the source S to each of the reference pressure and third supply lines RPL, $SL_3$.

A third orifice plate $OP_3$ is disposed in the third supply line $SL_3$ between the upstream and downstream ends. Assuming that the inner diameters of the first, second, and third supply lines $SL_1$, $SL_2$, $SL_3$ are the same and assuming that the pressure differentials across the first, second, and third orifice plates $OP_1$, $OP_2$, $OP_3$ are the same, while the orifice formed in each of the first, second, and third orifice plates $OP_1$, $OP_2$, $OP_3$ may be the same, they need not be the same so long as the relative values of the cross-sectional areas of the orifices formed in the orifice plates $OP_1$, $OP_2$, $OP_3$ are known. Therefore, the values of $C_d$ and $\beta$ for each of the first, second, and third orifice plates $OP_1$, $OP_2$, $OP_3$ are the same. If the internal orifice diameters d of the orifices formed in the first, second, and third orifice plates $OP_1$, $OP_2$, $OP_3$ are the same, then the mass flow rates across those orifice plates $OP_1$, $OP_2$, $OP_3$ is by corollary rule also the same. If one or more of the internal orifice diameters of the orifices formed in the first, second, and third orifice plates $OP_1$, $OP_2$, $OP_3$ are not the same but the relative values for each is known, then the relative values for mass flow rates across each of those plate orifices $OP_1$, $OP_2$, $OP_3$ is similarly known. As one example, the internal diameter d of the orifice formed in the first orifice plate $OP_1$ is multiple of those of the orifices formed in the second and third orifice plates $OP_2$, $OP_3$.

A pressure control valve $PCV_3$ is disposed in the third supply line $SL_3$ between the third orifice plate $OP_3$ and the downstream end of the third supply line $SL_3$. This flow control valve $PCV_3$ is adapted and configured to allow a flow of hydrogen through the third supply line $SL_3$ when a pressure in the delivery line DL is below a second predetermined set point pressure and to prevent a flow of hydrogen through the third supply line $SL_3$ when a pressure in the delivery line DL is at or above the second predetermined set point pressure. Thus, this pressure control valve $PCV_3$ is not a variable pressure valve in that it is either entirely open or entirely closed. It should be noted that the reference pressure line RPL is further adapted and configured to receive the associated flow of hydrogen from the source S at a same pressure as the flow of hydrogen received by the of the third supply line $SL_3$. Alternatively, the reference pressure line RPL is further adapted and configured to receive the associated flow of hydrogen from the source S at a pressure different from that of the flow of hydrogen received by the third supply line $SL_3$ so long as there is a constant difference in pressure between those two pressures.

As discussed above, the pressure control valve $PCV_2$ in the second supply line $SL_2$ allows a flow of hydrogen through the second supply line $SL_2$ and into the delivery line DL when the pressure is below the first predetermined set point pressure in the delivery line DL. The pressure control valve $PCV_3$ in the third supply line $SL_3$ similarly allows a flow of hydrogen through the third supply line $SL_2$ and into the delivery line DL when the pressure is below the second predetermined set point pressure in the delivery line DL. The second predetermined set point pressure is lower than the first predetermined set point pressure, which in turn is selected to be lower than a pressure ordinarily expected to be realized in the vehicle tank at the completion of a fill.

With respect to the embodiment of FIG. 2, the pressure in the delivery line DL (which is reflective of the pressure in the vehicle tank) is relatively low at the beginning of the fill and ordinarily below the first predetermined set point pressure. At this point during the fill, hydrogen flows through each of the first and second supply lines $SL_1$, $SL_2$ and into the vehicle via the delivery line DL at a mass flow rate equal to the sum of the mass flow rates through the first and second orifice plates $OP_1$, $OP_2$. As the hydrogen flows into the vehicle tank and the vehicle tank rises towards but does not reach the first predetermined set point pressure, the pressure ramp rate does not stay constant but instead rises due mostly due to temperature effects inside the hydrogen tank and an increase in the compressibility factor causing the pressure of the hydrogen in the tank to rise above and beyond that expected from the accumulating mass of hydrogen gas in the fixed volume of the tank. When the pressure in the delivery line DL rises to and above the first predetermined set point pressure, the pressure control valve $PCV_2$ in the second supply line $SL_2$ closes to prevent a flow of hydrogen through the second supply line $SL_2$ into the delivery line DL. Thus, the mass flow rate of hydrogen into the vehicle tank is then lowered to the mass flow rate of hydrogen through only the first orifice plate $OP_1$.

It should be noted that, in the embodiment FIG. 2, if the pressure in the delivery line at the beginning of a fill is above the first predetermined set point pressure, the vehicle tank is only filled from the first supply line $SL_1$. In such a case, the mass flow rate into the vehicle tank is of course equal to the mass flow rate through the first orifice plate.

With respect to the embodiment of FIG. 3, the pressure in the delivery line DL (which is reflective of the pressure in the vehicle tank) is relatively low at the beginning of the fill and ordinarily below the second predetermined set point pressure. At this point during the fill, hydrogen flows through each of the first, second, and third supply lines $SL_1$, $SL_2$, $SL_3$ and into the vehicle via the delivery line DL at a mass flow rate equal to the sum of the mass flow rates through the first, second, and third orifice plates $OP_1$, $OP_2$, $OP_3$. As the hydrogen flow into the vehicle tank rises towards but does not reach the second predetermined set point pressure, the pressure ramp rate does not stay constant but instead rises due mostly due to temperature effects inside the hydrogen tank and an increase in the compressibility factor causing the pressure of the hydrogen in the tank to rise above and beyond that expected from the accumulating mass of hydrogen gas in the fixed volume of the tank. When the pressure in the delivery line DL rises to and above the second predetermined set point pressure, the pressure control valve $PCV_3$ in the third supply line $SL_3$ closes to prevent a flow of hydrogen through the third supply line $SL_3$ into the delivery line DL. Thus, the mass flow rate of hydrogen flowing into the vehicle is lowered to the sum of the mass flow rates of hydrogen through the first and second orifice plates $OP_1$, $OP_2$. Again, as the pressure of the hydrogen flowing into the vehicle tank continues to rises towards but does not reach the first predetermined set point pressure, the pressure ramp rate similarly does not stay constant but instead rises due mostly due to temperature effects inside the hydrogen tank and an increase in the compressibility factor causing the gas in the tank to expand above and beyond that expected from the accumulating mass of hydrogen gas in the fixed volume of the tank. When the pressure in the delivery line DL rises to and above the first predetermined set point pressure, the pressure control valve $PCV_2$ in the second supply line $SL_2$ closes to prevent a flow of hydrogen through the second supply line $SL_2$ into the delivery line DL. Thus, the mass flow rate of hydrogen into the vehicle tank is of course lowered to the mass flow rate through only the first orifice plate $OP_1$.

It should be noted that, in the embodiment FIG. 3, if the pressure in the delivery line DL at the beginning of a fill is above the second predetermined set point pressure, the vehicle tank is only filled from the first and second supply lines $SL_1$, $SL_2$. In such a case, the mass flow rate into the vehicle tank is of course equal to the sum of the mass flow rates of hydrogen flowing through the first and second orifice plates $OP_1$, $OP_2$. Similarly, if the pressure in the delivery line DL at the beginning of a fill is above the first predetermined set point pressure, the vehicle tank is only filled from the first supply line $SL_1$. In such a case, the mass flow rate into the vehicle tank is of course equal to the mass flow rates of hydrogen flowing through only the first orifice plate $OP_1$.

Figure 4:
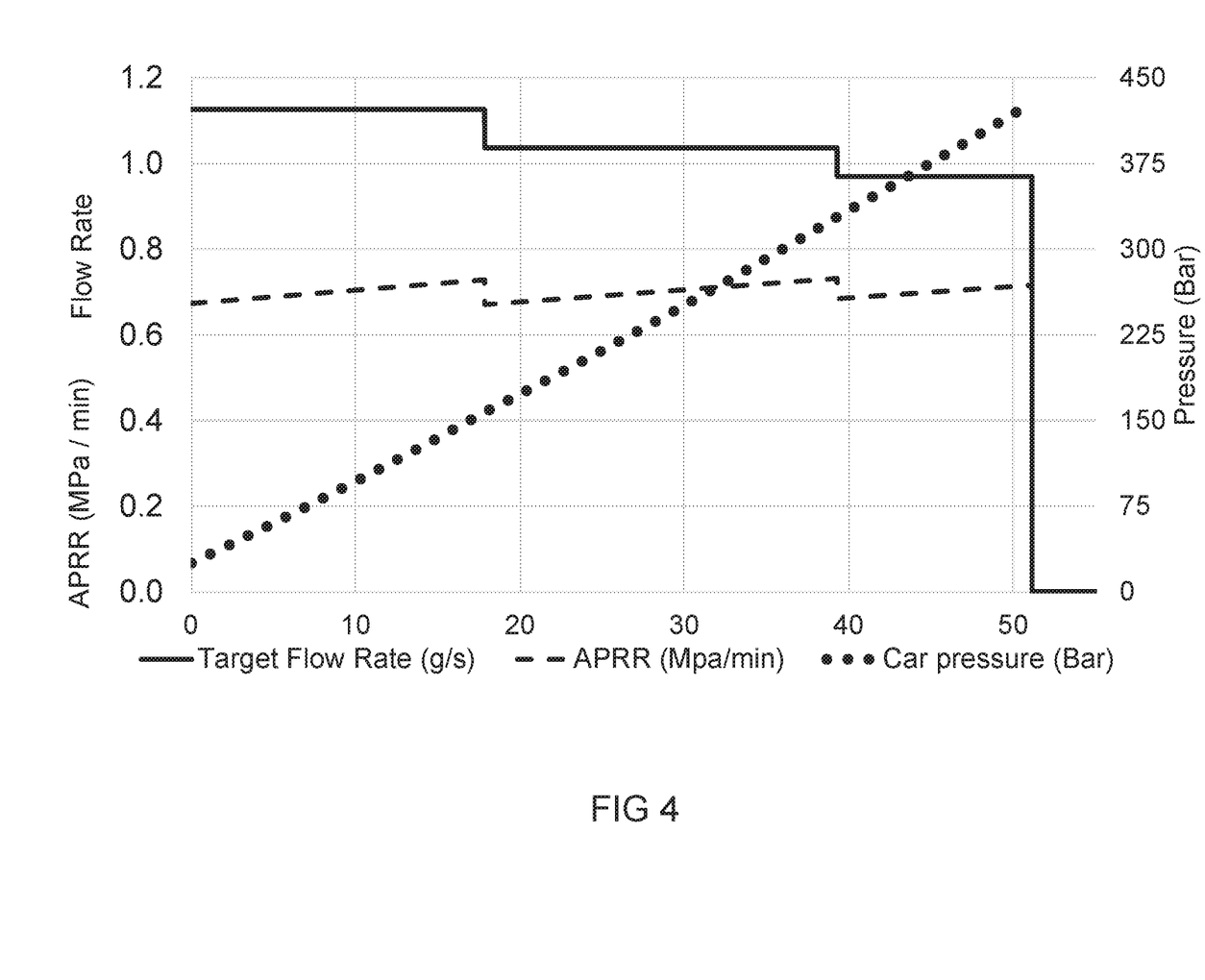
FIG. 4 is a graph of an APRR-controlled fill.

As best shown in FIG. 4, performance of the embodiment of FIG. 3 approximates the maintenance of a pressure ramp rate around an APRR. As best shown in FIG. 4, the vehicle tank pressure is initially below 125 bar and pressure control valves $PCV_2$, $PCV_3$ in each of the second and third supply lines $SL_2$, $SL_3$ are open, leading to a mass flow rate through the delivery line DL to the vehicle tank of 1.10 g/s. The pressure control valve of the third supply line $SL_3$ has a second predetermined set point of 125 bar. As the pressure in the delivery line DL (which is a proxy for the pressure in the vehicle tank) reaches 125 bar, the pressure control valve $PCV_3$ in the third supply line $SL_3$ closes and prevents the flow of hydrogen through the third supply line $SL_3$ to the delivery line SL. Because the hydrogen now flows only through the first and second supply lines $SL_1$, $SL_2$, the mass flow rate through the delivery line SL to the vehicle tank is 1.02 g/s. The pressure control valve $PCV_2$ of the second supply line $SL_2$ has a second predetermined set point of 250 bar. As the pressure in the delivery line DL reaches 250 bar, the pressure control valve $PCV_2$ in the second supply line $SL_2$ closes and prevents the flow of hydrogen through the second supply line $SL_2$ to the delivery line DL. Because the hydrogen now flows only through the first supply line $SL_1$, the mass flow rate through the delivery line DL to the vehicle tank is 0.95 g/s. The fill continues until the source pressure and vehicle tank pressure are equalized.

One of ordinary skill in the art will recognize that controlling the pressure ramp rate is not limited to the embodiments of FIGS. 2-3. Rather, there may be more supply lines each of which would have an associated orifice plate and pressure control valve similar or identical to those of the first, second, or third supply lines. Thus, the pressure ramp rate-controlled fill may be accomplished in two steps (as in the embodiment of FIG. 2), in three steps (as in the embodiment of FIG. 3) or in greater than three steps. Regardless of the number of steps, the initial hydrogen tank pressure will determine how many pressure control valves are open at the start of the fill. Each orifice plate and associated pressure control valve will be respectively sized and set to approximate a predetermined APRR. For example, the March, 2010 SAE J2601 standard for ambient temperature fills at an ambient temperature of 35 C, calls for performing the fill for an APRR of 0.7 MPa/minute. In that particular example, the orifice plates are sized and the associated pressure control valves have set so that a fill approximately having an APRR of 0.7 MPa/minute is achieved. Typically, the orifice plates are sized and the pressure control valves are set so that the mobile dispenser is adapted and configured to perform an ambient temperature table according to the March, 2010 is required to work in ambient temperature ranging from −30 C to 40 C.

The embodiments of FIGS. 2-3 are particularly advantageous because they allow an even safer and faster fill in comparison to the embodiment of FIG. 1. While the embodiment of FIG. 1 provides for a good deal of predictability because it delivers hydrogen at a constant mass flow rate, an orifice plate in such an arrangement must be appropriately sized so as to avoid too fast of a rise in the pressure of the vehicle tank. If the orifice plate has a relatively large size, it allows a higher mass flow rate and consequently a more rapid fill. However, due to the change in the expansibility factor of hydrogen at increasing pressures, the temperature within the vehicle tank may increase at a rate that exceeds the rate at which heat may be transferred from the hydrogen within the vehicle tank to the ambient environment. If this occurs, the vehicle tank may overheat, thereby increasing risk of an uncontrolled release of hydrogen. While such a result may of course be ameliorated by using a relatively smaller orifice plate so as to produce a mass flow rate that will not cause the vehicle tank to overheat at the end of the fill, such an orifice plate will produce a relatively smaller flow rate over the entire fill and thus increase the fill time.

In contrast, the embodiments of FIGS. 2-3 allow the use of relatively larger orifices earlier in the fill so that a relatively greater mass flow rate may be achieved before a relatively smaller orifice plate is used later in the fill for prevention of overheating. In this manner, the overall fill time is significantly shorter in comparison to the embodiment of FIG. 1 having an appropriately sized orifice plate designed for prevention of vehicle tank overheating at the end of the fill.

Regardless of whether the APRR is controlled or not, the method and system do not include an electronically-controlled components requiring the use of an electrical supply. Because it is purely mechanical in nature, it may use hydrogen sources where there is no electrical supply. The mobile dispenser also does not require a user for flow control, and in some embodiments can produce a steady flow output compliant with ambient fueling protocols, such as the March, 2010 J2601 draft standard.

The mobile dispenser is intended to be deployed during the initial hours of an extended station outage. Typically, the mobile dispenser is not used for long term hydrogen filling station outages, such as those lasting longer than 48 hours.

The mobile dispenser is also intended to be deployed for road side refueling for drivers desiring the convenience of refilling at a location other than a permanent station or for drivers requiring a refill at a location where there are no stations within the driving radius rendered possible by the amount of hydrogen gas still remaining in the tank.

The mobile dispenser is relatively small. It is also portable, with a typical weight of less than 50 kg, less than 25 kg, and in some cases, even less than 15 kg. Often, the mobile dispenser is small enough to fit in the back of a passenger vehicle and be loaded and unloaded by a single person or as few as two persons, thereby providing flexibility for use by a single user or two users in a wide variety of applications.

The mobile dispenser will also be designed with the ability to receive gaseous hydrogen from any of a wide variety of sources, including but not limited to: a) existing ground storage for a permanent hydrogen filling station with a typical pressure range of 200-450 bar, b) a hydrogen tube trailer with a typical pressure range around 165 bar or 450 bar, c) hydrogen cylinders often filled to a pressure of 165 bar, d) conventional gaseous hydrogen storage tanks pressure equalized from a hydrogen tube trailer, and thus, typically with a pressure range of 200-450 bar, and e) a liquid hydrogen storage tank coupled with a vaporizer. In order for a vehicle tank to be at least partially filled, the pressure in the vehicle tank must be lower than that of the source. Thus, the mobile dispenser is only capable of filling the vehicle tank up to the source pressure because it is not intended to be integrated with a compressor.

It does not require communications between the vehicle and the dispenser or cooling of the hydrogen, but rather is meant to be operated at the prevailing ambient temperature.

For reasons of safety, the vehicle operator may wish for a trained operator to carry out the fill using the mobile dispenser.

The mobile dispenser and method of use may be distinguished from conventional permanent hydrogen filling stations. As mentioned above, the mobile dispenser avoids the need for a PLC, the need for powering a PLC, and the need for operator control of a pressure control valve set point during a fill. The upstream pressure of hydrogen used by a conventional hydrogen filling station is typically constant because the storage vessel containing it is constantly being refilled by a compressor. In the case of the mobile dispenser, because there typically is no operating compressor, the pressure of the source of the hydrogen fed to the mobile dispenser will decrease over time as the vehicle tank is being filled. If the backpressure regulator control by the differential pressure regulator was not implemented, a constant pressure differential across the orifice plate would not be achieved. Thus, a constant mass flow rate would not be achieved. Also, the mobile device will not measure the amount of hydrogen delivered into the vehicle tank (because it contains no flow meter), nor will it provide a point of sale for a customer to pay for the fill. This allows the mobile dispenser to be used as a backup to a permanent hydrogen filling station when power is down or when the vehicle requiring a fill is at a remote location where power is not readily available.

The mobile dispenser may be used to at least partially fill the hydrogen tank of a fuel cell-powered vehicle as follows.

The upstream end of the first supply line is placed in downstream fluid communication with a source of gaseous hydrogen. The downstream end of the delivery line is placed in upstream fluid communication with the vehicle tank. A flow of hydrogen from the source, through the mobile dispenser, and into the vehicle tank is initiated. through at least the first supply and delivery lines, and into the vehicle tank is initiated. Typically, the flow is initiated by opening one or more valves at the source allowing the hydrogen to flow into the mobile dispenser. The flow of hydrogen is discontinued, the upstream end of the supply line is removed from fluid communication with the source, and the downstream end of the delivery line is removed from fluid communication with the vehicle tank.

Discontinuation of the flow may be conditioned upon the occurrence of any one or more of the following non-limiting list of events: elapse of a predetermined time duration, passage of a predetermined amount of hydrogen from the source to the tank has occurred, the pressure of the vehicle tank reaches a predetermined pressure, and pressure balance is achieved between the source and the vehicle tank. Preferably, the flow is discontinued automatically upon reaching pressure balance between the source and the vehicle tank. Since pressure balance will result in flow rate of zero, it may be observed through the use of a flow meter installed in the delivery line.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A mobile hydrogen dispenser for at least partially filling a hydrogen tank of a fuel cell-powered vehicle, said dispenser comprising:
a first supply line having upstream and downstream ends, the upstream end of the first supply line being adapted and configured to receive a flow of hydrogen from a hydrogen source;
a first orifice plate disposed in the first supply line;
a back pressure regulator disposed at the downstream end of the first supply line, the back pressure regulator being a dome-loaded or spring-and-dome loaded back pressure regulator that is adapted and configured to maintain a pressure of gas in said first supply line between said orifice plate and said back pressure regulator at or below a variable set point pressure of the back pressure regulator, the variable set point pressure being set by a pressure in a dome of the back pressure regulator;
a delivery line having upstream and downstream ends, the upstream end being adapted and configured to receive a flow of hydrogen from the back pressure regulator, the downstream end of the delivery line being adapted and configured to direct the received flow of hydrogen to a hydrogen tank of a fuel cell-powered vehicle;
a nozzle fluidly communicating with the downstream end of the delivery line that is adapted and configured to engage with an opening of a fuel tank of a fuel cell vehicle;
a reference pressure line having an upstream end and a downstream end, the upstream end of the reference pressure line being adapted and configured to receive a flow of hydrogen from the hydrogen source;
a differential pressure regulator having an inlet and an outlet, the inlet of the differential pressure regulator being in downstream flow communication with the downstream end of the reference pressure line; and
a first pilot line in flow communication between the differential pressure regulator and a dome of the back pressure regulator, the differential pressure regulator being adapted and configured to maintain a constant pressure differential $\Delta P$ between a pressure of hydrogen in the reference pressure line and a pressure of hydrogen in the first pilot line.

2. The mobile dispenser of claim 1, further comprising:
a second supply line having an upstream end and a downstream end;
a second orifice plate disposed in the second supply line between the upstream and downstream ends thereof, the upstream end of the second supply line being adapted and configured to receive the associated flow of hydrogen from the source at either a same pressure as that of the first supply line or at a pressure such that there is a constant difference in pressure between those of the first and second supply lines, the downstream end of the second supply line being in flow communication with the first supply line in between the first orifice plate and the back pressure regulator; and
a pressure control valve disposed in the second supply line that is adapted and configured to allow a flow of hydrogen through the second supply line when a pressure in the delivery line is below a first predetermined set point pressure and to prevent a flow of hydrogen through the second supply line when a pressure in the delivery line is at or above the first predetermined set point pressure, wherein the reference pressure line is further adapted and configured to receive the associated flow of hydrogen from the source at either a same pressure as that of the second supply line or at a pressure such that there is a constant difference in pressure between those of the second supply and reference pressure lines.

3. The mobile dispenser of claim 2, further comprising:
a third supply line having an upstream end and a downstream end;

a third orifice plate disposed in the third supply line between the upstream and downstream ends thereof, the upstream end of the third supply line being adapted and configured to receive the associated flow of hydrogen from the source at either a same pressure as that of the first supply line or at a pressure such that there is a constant difference in pressure between those of the first and third supply lines, the downstream end of the third supply line being in flow communication with the first supply line in between the first orifice plate and the back pressure regulator; and a pressure control valve disposed in the third supply line that is adapted and configured to allow a flow of hydrogen through the third supply line when a pressure in the delivery line is below a second fixed set point pressure and to prevent a flow of hydrogen through the third supply line when a pressure in the delivery line is at or above the second fixed set point pressure, wherein the reference pressure line is further adapted and configured to receive the associated flow of hydrogen from the source at either a same pressure as that of the second supply line or at a pressure such that there is a constant difference in pressure between those of the second supply and reference pressure lines.

4. A method of at least partially filling the hydrogen tank of a fuel cell-powered vehicle, comprising the steps of:
   providing the mobile dispenser of claim 1;
   placing the upstream end of the first supply line in downstream fluid communication with a source of gaseous hydrogen;
   placing the downstream end of the delivery line in upstream fluid communication with the vehicle tank;
   allowing a flow of hydrogen from the source, through the mobile dispenser, and into the vehicle tank;
   discontinuing said allowed flow;
   removing the upstream end of the first supply line from fluid communication with the source; and
   removing the downstream end of the delivery line from fluid communication with the vehicle tank.

5. The method of claim 1, wherein said discontinuation of said flow automatically occurs upon reaching pressure balance between the source and the vehicle tank.

* * * * *